Nov. 13, 1962  E. N. CONNOY  3,063,310
METAL CUTTING SAW BANDS AND BLADES
AND METHOD OF MAKING THE SAME
Filed Oct. 15, 1959  2 Sheets-Sheet 1
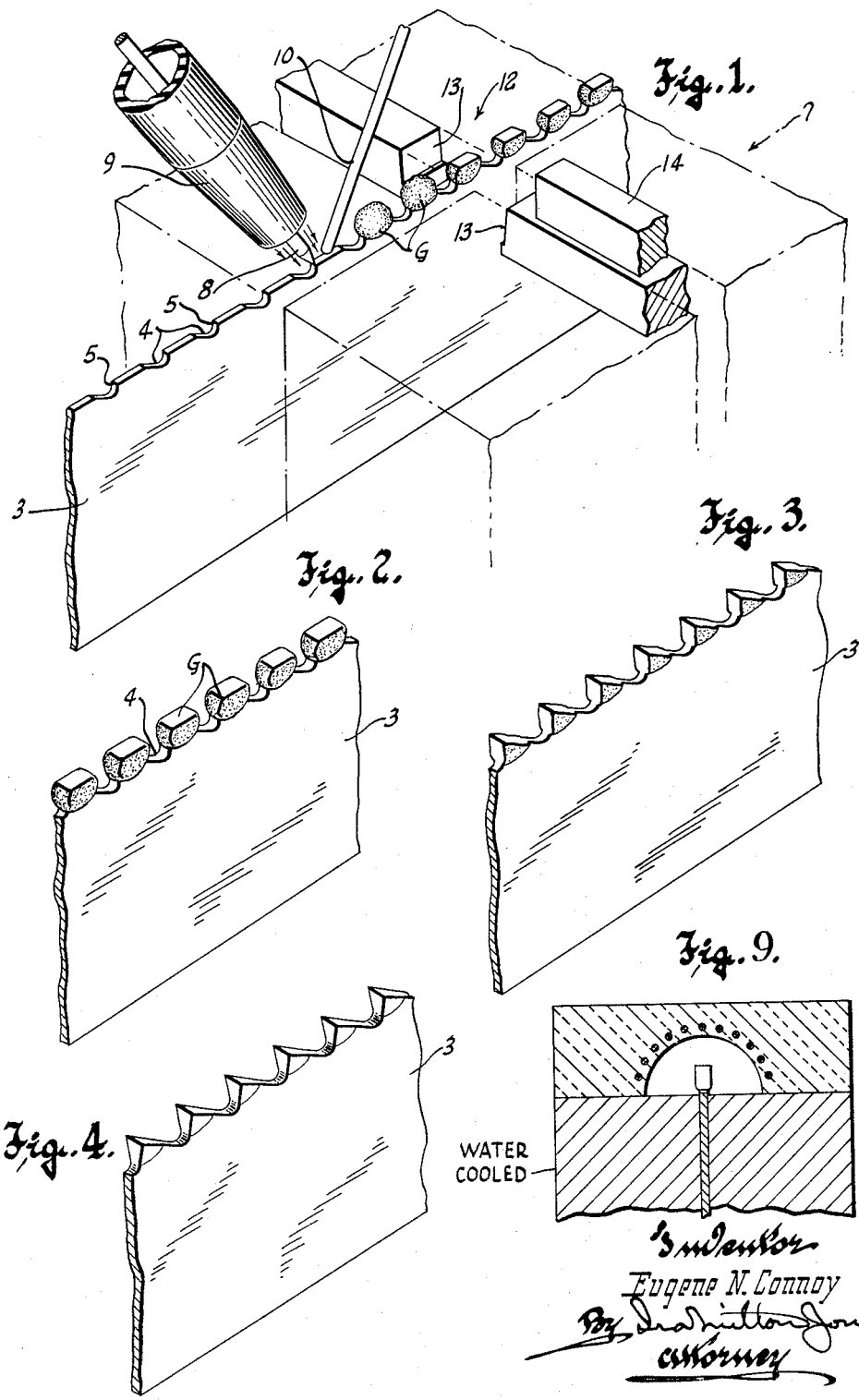
Inventor
Eugene N. Connoy Nov. 13, 1962 E. N. CONNOY 3,063,310
METAL CUTTING SAW BANDS AND BLADES
AND METHOD OF MAKING THE SAME
Filed Oct. 15, 1959 2 Sheets-Sheet 2
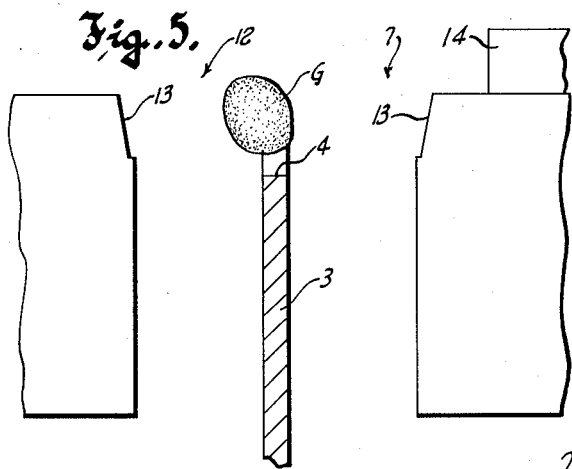
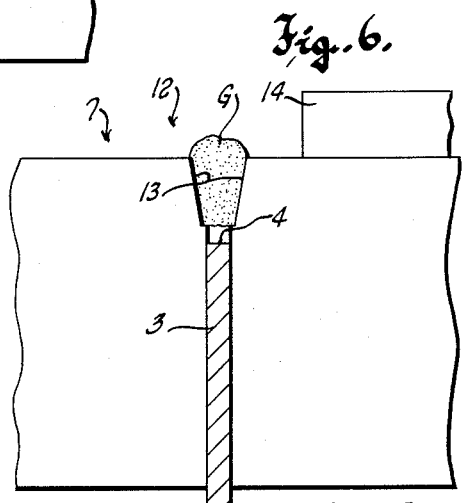
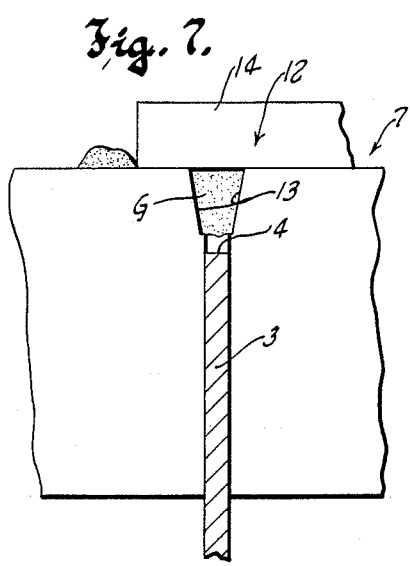
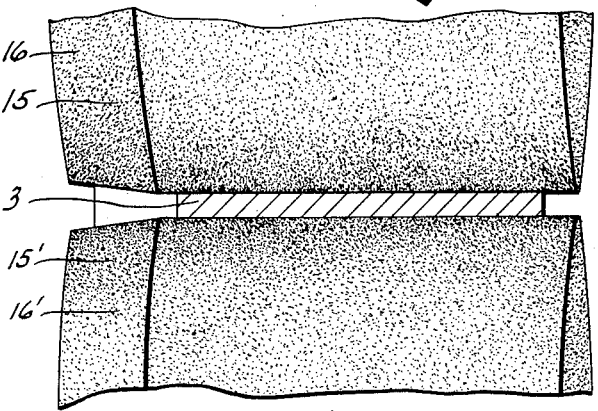
Inventor
Eugene N. Connoy 3,063,310
METAL CUTTING SAW BANDS AND BLADES AND
METHOD OF MAKING THE SAME
Eugene N. Connoy, Minneapolis, Minn., assignor to Continental Machines, Inc., Savage, Minn., a corporation of Minnesota
Filed Oct. 15, 1959, Ser. No. 846,734
10 Claims. (Cl. 76—112)

This invention relates to the art of making saws and, though not limited thereto, is especially concerned with metal cutting band saws, the making of which poses problems not encountered in the manufacture of other types of saws and metal cutting tools.

The advantages of a saw having extremely hard cutting teeth and a tough fatigue resistant back or body have been known and understood for many years. The prior art is replete with attempts to attain this result, but prior to this invention there never has been a commercially feasible way of economically making saw bands or blades which possess these attributes, and which can be used in band type machine tools designed and intended to cut very accurately and straight.

Quite early in the art, saw blades were made of a compound steel strip or ribbon consisting of a narrow band of very hard steel welded to one edge of a wide band of softer steel, the teeth obviously being in the hard steel band. The Neihl Patent No. 907,167, is an example of this practice. Another approach to the problem was through selective heat treatment and tempering of the saw band or blade, that is, giving the teeth a heat treatment different from that of the rest of the band. This expedient forms the basis of the Whitaker Patent No. 1,130,649, and the Napier Patent No. 1,352,140.

A third method consisted in brazing or otherwise fastening hard steel or carbide inserts in or to the tips of the teeth. This scheme proved quite successful in circular saws having relatively large teeth and in milling cutters, and even now is extensively used on these tools. The Segal Patent No. 2,600,272, shows one example of this practice. The Kolesh Patents Nos. 2,826,941 and 2,880,768 illustrate the insert tooth tip method applied to a band saw, but it should be noted that in these patents the saw teeth are quite large and widely spaced, the saws being intended for the cutting of wood and non-ferrous metals, such as aluminum. To this date, all attempts to achieve the ideal saw by attaching hard steel inserts in the tips of the teeth have not been successful in the case of metal cutting saw bands. Although the bands tested cut sharp and clean, they were very short lived. The inserts soon broke loose.

The production of a long saw band for use in band saws also poses problems not encountered in the making of relatively short hack saw blades. For a saw band to run true in a band saw, the band must be straight. Hence, any method employed to obtain the desired combination of extremely hard teeth and a tough fatigue resistant back must not introduce stresses which will warp the band. This is especially important where the machine in which the saw band is to be used is expected to cut very accurately and straight through large sections of hard metal. Another factor to be taken into account is that it should be possible to resharpen the saw teeth.

Prior to this invention, the best results by far have been obtained with the saw bands made in accordance with the W. T. Anderson Patent No. 2,786,788, issued in 1957, but the saw band of the Anderson patent does not lend itself well to resharpening. More important, however, is its high cost which stems from the fact that it is made entirely of high speed steel. The current price of M-2 high speed steel strip stock 2" wide and .050 inch thick is $1.50 per foot, while that of spring steel strip of the same size is only twenty cents (.20) per foot. In view of this wide cost differential, it is obvious that a successful method of producing a saw band having the desired hard high speed cutting edges on its teeth and in which all but the tip portions of the teeth is of ordinary inexpensive steel, meets a long felt need.

From the test conducted with saw bands produced in accordance with the present invention, it appears beyond doubt that this invention fully satisfies this need; and beyond this, provides a saw band which can be resharpened six or eight times.

Moreover, this invention makes it economically possible and feasible for the first time, to obviate the need for setting teeth as is ordinarily necessary, by enabling the teeth to be simply and easily given a wedge shaped cross section with their opposite sides or faces receding from the cutting edge which is the widest part of the tooth and wider than the thickness of the back.

Since the invention is primarily concerned with the production of band saw blades or bands (though it encompasses hack saw blades and circular saws), the saw back will be referred to hereinafter as a band or strip.

The invention contemplates forming or casting beads of high speed tool steel on the edge of a strip or band of steel having the properties necessary to withstand shock and afford adequate resistance to fatigue failure caused by repeated flexure, and then grinding or otherwise shaping these beads and the contiguous portions of the strip or band to form the teeth, it being understood that the beads are spaced at intervals corresponding to the pitch of the saw. The crux of the invention resides in the manner in which these beads are formed or cast on the strip or band. Briefly, this consists in heating to substantially the melting point, small localized edge portions of the strip or band at intervals corresponding to the pitch of the saw to be produced; producing a globule of molten high speed steel in a zone closely adjacent to the edge portion of the strip being heated; and then depositing this globule onto the molten edge portion of the strip with which it fuses, and allowing the globule and heated edge portion to cool and solidify. This procedure is, of course, repeated at each point along the edge of the strip where a tooth tip is to be located.

The localized edge portions of the strip may be defined by first punching the edge of the strip or otherwise machining it to form saw teeth, in which event, the final shaping of the teeth requires less machining; or they may be defined by simply forming a series of relatively shallow notches in the edge of the strip; but in either case, the localized portions of the strip or band which are heated to make them receptive to the globule of molten high speed steel, must be well defined and preferably should have relatively sharp corners.

Also, during the heating of its localized edge portions, the rest of the strip, that is, the portion thereof below its notched or toothed edge portion, must be cooled to prevent loss of hardness.

The heating of the localized edge portions of the strip may be done by an electric arc, preferably shielded by, or enshrouded in, a current of suitable inert gas, such as argon, to prevent objectionable depletion of carbon and other alloys; and the globules of molten high speed steel are preferably produced by projecting a thin rod or wire of the selected tool steel into the arc and contiguous to the molten localized edge portion of the backing strip or band. In an instant, the end of the high speed steel rod or wire melts and forms a globule. This globule is confined solely by its surface tension, but readily fuses or welds itself to the molten spot on the edge of the backing strip, which too has the appearance of a tiny globule or pool.

The heating of a localized edge portion of the strip and the formation and deposition of a globule of high speed steel thereon takes but a moment, and as soon as it occurs the application of heat to that portion of the strip is terminated.

Because of the very small volume of the combined globule of high speed steel and the molten localized edge portion of the strip upon which the globule has been deposited, compared to the surface area thereof and the much larger mass of the adjacent unheated portion of the strip or band, the globule solidifies almost instantaneously even without special cooling or quenching.

However, it has been found advantageous to flatten the globule between suitably cooled jaws or shaping dies directly after it is deposited on the edge of the strip and while it is still in its molten state retained only by surface tension. "Clamping" the globule or bead between such dies has two important functions. First, it centers the globule on the strip, and, second, it hastens its cooling. The centering of the globule on the strip is of great importance. Unless it is done there is no uniformity in the location of the beads as they solidify on the strip. In their molten condition at the time of their placement on the strip, only surface tension confines the globules and, in practice, they actually wobble about on the edge of the strip before they solidify. Hence, unless externally held, the globules solidify in many different positions on the strip.

While the centering of the globules on the strip is best done by a pair of jaws or dies which come together and grip the strip therebetween, it could be done by jets of a suitable gas impinging upon the globules from opposite sides of the strip to thereby hold the globules against tipping one way or the other. Such jets would also hasten the cooling of the globules.

As each globule solidifies, the contiguous portions of the two dissimilar metals (globule and strip) fuse together and form a relatively thin junction zone which is neither high speed steel nor the steel of the strip, but, instead, is a fusion of the two. There are, of course, no adulterants such as brazing material in this fusion zone, but, most important, except for the very small part of the globule which combines with the steel of the backing strip to form the fusion zone, the globule and the resulting bead from which the cutting tip portion of the tooth is formed, remains as unadulterated high speed steel.

Since it is the bead from which the cutting portion or tip of the tooth is formed, the bead must be large enough and so placed on the strip that it may be ground to the required shape and configuration; but it should not be larger than needed for this purpose. Generally speaking, the maximum dimension of the globule, which is always transverse to the strip, should be at least twice the thickness of the band or strip, but it may be larger. For an example, a globule having a maximum dimension of .100" has been successfully applied to a backing strip of .35" and a globule having a maximum dimension of .125" has been successfully applied to a backing strip of .050", but there is no advantage in making the globule any larger than is necessary for the finished shape, and there is a definite upper limit to the size of globule for a given band thickness.

If the globule is excessively large, its surface tension film will not be able to support it while it is seated on the edge of the strip, but, more seriously, its rate of cooling might not be fast enough to assure the desired metallurgical structure and hardness for the finished tooth tip. The size of the globule that can be contained within its surface tension envelope roughly bears a relationship to the thickness of the strip, since this dimension to a large degree determines the area of the supporting surface for the globule; and since the thickness of the band or strip seldom exceeds 0.080", even the largest globule that can be seated on the strip without having the tensile stresses in its surface tension envelope exceed the tensile strength of the surface tension film, will be small enough to assure sufficiently rapid cooling of the globule in the open atmosphere to secure the desired metallurgical properties.

For purposes of illustration, for a backing strip having a thickness of fifty thousandths of an inch (.050") the volume of the globule desirably is about .0005 cubic inches; and with this volume its surface area would be .031 square inch. The ratio of volume to surface is thus about 1 to 60. This ratio is substantially constant for optimum results throughout the full range of band thicknesses.

When the proper ratio of volume to surface area is maintained, the globules cool fast enough in the open atmosphere without additional cooling, to practically assure the desired metallurgical properties, and when specially cooled in the manner hereinbefore described, will unquestionably possess the desired properties.

Despite the fact that the bead of high speed steel (the solidified globule) has a dendritic-austenitic structure, it possesses the functional attributes of steel used for fine high speed metal-cutting tools. Its hardness is in the range of 63–66 Rc. It is not brittle but, on the contrary, is actually malleable at least to a degree and will not break off even under severe impact loads. Not a single tooth tip produced in accordance with this invention has been broken off in use, despite the fact that the product of this invention has been given very extended and severe tests.

Just what takes place as the bead is "cast" onto the backing strip is not known, but photomicrographs reveal that it has a fine grain, free from the objectionable skeleton-like structure of the inevitably present carbide, which is characteristic of as-cast high speed steel.

As further evidence that the steel of which the beads are formed possesses metallurgical properties different from those of as-cast high speed steel, and, on the contrary, those of properly worked high speed steel, is the fact that the beads may be tempered to bring them to secondary hardness. By tempering the beads their hardness is increased a few points and the tooth tips retain their hardness even at red heat.

The tempering, of course, should be done before the beads are ground or otherwise shaped into tooth tips, since tempering after the teeth are formed might result in a loss of sharpness; and, following the recommendations of manufacturers of good quality high speed steel, double tempering is advisable.

Though tempering to secondary hardness in the conventional manner is the only way of assuring that the tooth tips will have and will retain the ability to cut at red heat, it has been found that where the first use of a saw band made in accordance with this invention, but not tempered, was to cut cold rolled steel, the teeth acquired a secondary hardness. This followed, no doubt, from the fact that during the cutting operation the temperature of the teeth rose to the tempering range, which is in the neighborhood of 1000° F. However, since the first use of the saw band might be on more easily cut material, during which the maximum temperature reached might not exceed that at which the hardness of the steel in the tooth tips dropped to its low point, it is, of course, preferable in all cases to temper the high speed steel tips of the teeth.

The described deposition of the globules of high speed steel onto the edge of the backing strip or onto the tops of preformed teeth thereon, can be, and has been, done manually. The band or strip in which full teeth or only shallow notches to define corners have been formed, is simply gripped in a suitably cooled vise or other holder through which the band can be made one terminal of an electric arc. Then, by means of a "Heliarc" welder which uses a tungsten rod as the "hot" electrode, the tip of the tooth or the corner, either of which constitutes a localized portion of the edge of the strip, is heated to 's melting point. The instant melting takes place, the nd of the rod or wire of high speed steel, preferably annealed, is inserted into the arc, above or directly adjacent to the molten edge portion of the strip, with the result already described, namely, the deposition and fusion of a globule of high speed steel onto the edge of the strip.

It is preferable that the tungsten rod of the welder be bathed or enshrouded in a current of argon, or other suitable non-oxidizing gas, since in so doing the depletion of carbon and other alloys from the steel—both that of the strip and the globule—is held to a minimum and, in addition, the tungsten rod is kept cleaner and the resulting beads are free of objectionable surface scale. These advantages of using a protective atmosphere and the consequences of not doing so, are, of course, well understood in the art.

While the globules are cooling they are preferably held centered on the edge of the strip, in any suitable way; and after the globules solidify, the thus formed beads of high speed steel are tempered to give them a secondary hardness. Double tempering at a temperature of 925° F. has been used in practice.

Next, the front and top of the beads are ground off to form the tips of the teeth. Of course, where the strip has actual tooth forms formed therein before the beads are cast onto the strip, this grinding step does little more than shape and sharpen the tooth tips.

Finally, the sides of the teeth are ground off, either to parallelism and flush with the sides or faces of the strip, or to a tapered shape so that the finished tooth tips will have a wedge or keystone shaped cross section with a wide cutting edge and receding side faces to obviate the need for setting the teeth. Preferably this is done by passing the entire band endwise between a pair of circumferentially adjacent grinding wheels wide enough to span the full width of the saw band and spaced apart the distance required to give the band its intended thickness, and if the tapered tooth shape is desired, the grinding wheels must be correspondingly shaped.

The specific composition of the steel used for the backing strip, to some extent is determined by the physical requirements of the finished band. Thus, the backing strip may be made of any one of the four types of steel identified by the following AISI-SAE numbers, or similar steels:

6150, 1060, 9254, 9261

The typical analyses of these steels are as follows:

|  | AISI-SAE 6150 | AISI-SAE 1060 | AISI-SAE 9254 | AISI-SAE 9261 |
| --- | --- | --- | --- | --- |
| Carbon | .48/.53% | .55/.65% | .50/.60% | .55/.65% |
| Manganese | .70/.90 | .60/.90 | .50/.80 | .75/1.00 |
| Phosphorous | .040 Max. | .040 Max. | .040 Max. | .040 Max. |
| Sulfur | .040 Max. | .050 Max. | .040 Max. | .040 Max. |
| Silicon | .20/.35 |  | 1.20/1.60 | 1.80/2.20 |
| Chromium | .80/1.10 |  | .50/.80 | .10/.25 |
| Vanadium | .15 Min. |  |  |  |
| Iron | Bal. | Bal. | Bal. | Bal. |

The 6150 steel, with a hardness of 40 to 50 Rc, has been found to be entirely satisfactory.

The high speed steel of which the globules or beads are formed, may be any one of a wide variety of high speed tool steels, all of which have the common functional attribute of maintaining hardness at high temperatures, i.e. in the neighborhood of 1000° F., in addition to high structural strength and the other qualities of good tool steel. These steels are broadly divided into two basic types—the M type and the T type, the M and the T signifying, with a few exceptions, the major alloying elements entering into their composition—namely, molybdenum and tungsten. The steel industry has standardized on the composition of a number of these high speed steels, and the following table identifies some of them by their letter and number symbols and gives the analysis of each:

| SAE | Carbon | Manganese | Silicon | Chromium | Vanadium | Tungsten | Molybdenum | Cobalt | Iron |
| --- | --- | --- | --- | --- | --- | --- | --- | --- | --- |
| T-1 | 0.70 | 0.30 | 0.30 | 4.10 | 1.00 | 18.00 |  |  | Bal. |
| T-2 | 0.80 | 0.30 | 0.30 | 4.10 | 2.10 | 18.50 | 0.80 |  | Bal. |
| T-3 | 1.05 | 0.30 | 0.30 | 4.10 | 3.25 | 18.50 | 0.80 |  | Bal. |
| T-4 | 0.75 | 0.30 | 0.30 | 4.10 | 1.00 | 18.00 | 0.80 | 5.00 | Bal. |
| T-5 | 0.80 | 0.30 | 0.30 | 4.10 | 2.00 | 18.50 | 0.80 | 8.00 | Bal. |
| T-6 | 0.80 | 0.30 | 0.30 | 4.50 | 1.50 | 20.00 | 0.80 | 12.00 | Bal. |
| T-8 | 0.80 | 0.30 | 0.30 | 4.10 | 2.00 | 14.00 | 0.80 | 5.00 | Bal. |
| T-15 | 1.57 | 0.25 | 0.25 | 4.75 | 5.00 | 12.50 |  | 5.00 | Bal. |
| M-1 | 0.80 | 0.30 | 0.30 | 4.00 | 1.10 | 1.50 | 8.50 |  | Bal. |
| M-2 | 0.84 | 0.30 | 0.30 | 4.10 | 2.00 | 6.00 | 5.00 |  | Bal. |
| M-3 | 1.15 | 0.30 | 0.30 | 4.10 | 3.00 | 5.75 | 5.25 |  | Bal. |
| M-4 | 1.27 | 0.25 | 0.30 | 4.50 | 4.00 | 5.50 | 4.50 |  | Bal. |
| M-10 | 0.85 | 0.30 | 0.30 | 4.10 | 2.00 |  | 8.00 |  | Bal. |
| M-15 | 1.57 | 0.25 | 0.25 | 4.75 | 5.00 | 6.50 | 3.00 | 5.00 | Bal. |

Practically all of these different steels can be used. M-2, M-3, M-4, T-8, T-15 and M-15 have been used, but most of the experimental work done has been with M-3 and M-4. With these steels, the bead, though having a dendritic-austenitic structure, possesses the functional attributes of steel used for fine high speed metal-cutting tools. Its hardness is 63–66 Rc before tempering to secondary hardness, and thereafter will be as high as 67 Rc. It is not brittle, but, on the contrary, malleable to a degree and, as already pointed out, can not be broken off the tooth on which it is formed by heavy impact loads.

In addition to the high speed steels above identified, and others of similar analysis, it is also possible to use steels such as the tool steels identified in the following table:

| SAE | Carbon | Manganese | Silicon | Chromium | Vanadium | Tungsten | Molybdenum | Cobalt | Iron |
| --- | --- | --- | --- | --- | --- | --- | --- | --- | --- |
| W-1 | .090/1.30 | 0.30 | 0.25 |  |  |  |  |  | Bal. |
| W-2 | 1.00 | 0.30 | 0.25 |  | 0.25 |  |  |  | Bal. |
| W-3 | 1.00 | 0.30 | 0.25 |  | 0.40 |  |  |  | Bal. |
| O-1 | 0.90 | 1.20 | 0.30 | 0.50 |  | 0.50 |  |  | Bal. |
| A-2 | 1.00 | 0.60 | 0.25 | 5.00 | 0.40 |  | 1.00 |  | Bal. |
| D-2 | 1.50 | 0.40 | 0.40 | 12.00 | 0.25 |  | 0.90 |  | Bal. |
| D-3 | 2.10 | 0.30 | 0.30 | 12.00 | 0.25 |  | 0.50 |  | Bal. |
| D-7 | 2.40 | 0.25 | 0.25 | 12.50 | 4.00 |  | 1.00 |  | Bal. |

For some purposes, as for the cutting of aluminum, it may even be desirable to form the beads of high carbon steel and not necessarily high speed steel.

Although an understanding of this invention no doubt may be gained without recourse to drawings, for convenience, the accompanying drawings have been provided, and in these:

FIGURE 1 is a perspective view illustrating more or less diagrammatically how the globules of high speed tool steel are placed on the band or strip, centered, and preliminarily shaped;

FIGURE 2 is a perspective view of a short length of band with partially shaped solidified globules or beads on it;

FIGURE 3 is a perspective view similar to FIGURE 2, but showing the beads partially ground;

FIGURE 4 is a perspective view illustrating the band after it and the beads have been ground to form teeth which are widest at their cutting edge so that setting of the teeth is obviated;

FIGURES 5, 6 and 7 are cross sectional views through the backing strip with a globule or bead thereon, diagrammatically illustrating one way of centering the molten globule on the strip and, at the same time, preliminarily shaping it and also cooling it;

FIGURE 8 diagrammatically illustrates the grinding of the opposite sides or faces of the band, during which operation the band is given its predetermined thickness, while at the same time the sides of the beads are ground, in this instance to a convergingly tapered form to give the teeth the wedge-shaped cross section which obviates setting the teeth; and FIGURE 9 is a cross sectional view through a muffle and a saw band passing therethrough, to illustrate the preferred manner of bringing the high speed steel beads to the temperature required to effect secondary hardness.

The legends appearing on the several views, to a large extent, obviate the need for reference characters, but for completeness, the invention contemplates first forming a strip 3 of alloy steel, such as S.A.E. 6150, with a hardness of 40–50 Rc, with notches 4 along one edge thereof. The notches may be produced in any suitable manner as by a punching operation. Their shape is not too important as long as they provide well defined equispaced corners 5. It is these corners which are heated to the fusion point and have globules of high speed steel deposited thereon.

In the actual application of the globules, the strip 3 is held between the jaws of a vise 7, or its equivalent, diagrammatically depicted in broken lines in FIGURE 1. Preferably the vise jaws are cooled by circulating a coolant therethrough. In any event, they are connected to the grounded side of a welding apparatus, such as that known as the Heliarc welder. The other side of the welder is connected to a tungsten electrode 8 projecting through a nozzle tip 9.

With the backing strip in the grip of the vise, the electrode 8 is applied to one of the corners 5 on the edge of the strip. This localizes the heat which results as an arc is drawn between the tungsten electrode and the grounded strip. At the same time, inert gas such as argon or helium issues from the nozzle 9 to envelop the entire work area.

By enveloping the work area in an inert gas, objectionable depletion of the carbon and other alloying elements from the steel—both that of the backing strip and the globules—is held to a minimum, as is, of course, well understood by the art.

Within a fraction of a second, the heated corner 5 is brought to its melting point, and at that instant a wire 10 of the chosen high speed steel is inserted into the arc. The end of the wire immediately melts and drops onto the melting corner 5 to form a globule G of high speed steel. Thereupon, the tungsten electrode 8 and the wire 10 are withdrawn, and within another fraction of a second the globule G not only is solidified, but relatively cool. Photomicrographs have shown that the junction between the "cast-on" globule or bead and the backing strip is almost sharp and that it extends for only a very narrow, thin zone. Nevertheless, this junction, unlike the brazed and similar connections used to attach inserts of hard steel to the mild steel back or body of saw bands and other metal cutting tools of the prior art, is homogeneous with the contiguous portions of the backing strip and the globule or bead, and it will not break during use of the tool. Even deliberate attempts to dislodge the solidified beads have failed.

Although the globules G may be left to solidify in whatever position they may assume with respect to the strip, it is preferable to center them on the strip and give them a preliminary shaping before they solidify. Accordingly, the jaws of the vise 7 are equipped with forming dies 12 which come together and successively grip the strip directly adjacent to each newly formed globule, as shown in FIGURE 6. The faces of the forming dies 12 have their upper portions cut back and sloped, as at 13, so that the globule or bead G is not only centered on the backing strip but also has its opposite sides shaped to be divergently sloped.

Of course, where the finished saw band is to have the conventional set teeth and not wedge-shaped teeth, the faces of the forming dies are parallel and simply center the globules and give them all the same uniform thickness, which, however, should be greater than that of the strip in order to allow for subsequent grinding of the sides of the teeth. In each instance, the contact of the dies 12 with the globules or beads hastens their cooling.

In addition to the preliminary shaping of the globules or beads G by the forming dies 12, it is also possible and desirable to shear off the excess top portion of the globules as shown in FIGURE 7. For this purpose, a shearing die 14 may be slidably mounted on one of the forming dies 12 to move across the tops of the forming dies after they have come together and have gripped the backing strip.

It should be understood that these various operations must be properly timed and coordinated. Thus, the jaws of the vise 7 must first come together to grip and hold the backing strip. Directly thereafter, a localized portion of the strip, i.e. a corner 5 thereon, is heated substantially to the melting point, at which time the globule G is "dropped" in place. During this time, the forming dies 12 come together to center a previously cast globule and shape its sides, followed by the shearing action of the die 14. The dies and vise jaws are then retracted and the backing strip is advanced or indexed a distance corresponding to the pitch of the saw band being made, whereupon the procedure is repeated.

All these various operations can be performed manually, but, of course, are more efficiently done by an automatically operating machine, in which event the several operations may be performed in multiple, with the result that the incremental advance of the backing strip may be in steps, each consisting of a multiple of the pitch of the saw band.

Although the metallurgical structure of the globules or beads G, when formed of M–4 high speed steel may be characterized as dendritic and not like that of well worked and properly heat treated high speed steel used for metal cutting tools, photomicrographs shows that it clearly does not have the objectionable carbide segregation and agglomeration characteristic of conventional as-cast high speed steel which must be forged and annealed before it can be heat treated to render it useful for metal cutting tools.

The difference undoubtedly is in the rate of cooling. In other words, the reason the beads need not be worked or forged to give them the attributes and properties of good high speed steel, which includes amenability to being tempered to secondary hardness, most likely resides in their small volume compared to their surface area, since this enables very rapid cooling of the globules; but whatever the reason may be, the results accomplished by this invention were utterly unexpected.

After the backing strip has had globules or beads of high speed steel cast thereon it is passed through a muffle 17 (FIGURE 9) which is so constructed that only the high speed steel beads are heated. Accordingly, the muffle 17, which may be three or four feet long, has a suitably cooled base 18 with a groove therein to slidably receive the strip with its beads G above the base and in an arched heating chamber 19. Suitable heating elements 20 in the "roof" of the heating chamber provide the heat source, and suitable insulation is provided to confine the heat to the chamber 19. As the beads G move through the chamber, they are heated to approximately 925° F. which, for most of the steels used, is sufficient to attain maximum secondary hardness.

If desired, the muffle 17 may be located to receive the strip or band directly after it leaves the globule applying station, but this is not essential. Tempering may be done at any time after the beads G are formed, but it should be before the beads are shaped into tooth tips. Also, it is preferable to pass the band through the muffle twice, or through two separate muffles to effect double tempering.

After the tempering operation, the top and front of the beads G are ground to give them the desired saw tooth shape, as shown in FIGURE 3. This operation may be performed in any conventional manner.

Next, the sides of the band are ground as shown in FIGURE 8. As already indicated, the grinding of the sides or faces of the band is best done by passing the band lengthwise between two companion grinding wheels 15—15'. Preferably the grinding is done by the electrolytic process which takes advantage of the combined effects of electrolytic erosion and concurrent mechanical abrasion, but in any event, the grinding wheels 15—15' are wide enough to encompass the entire band—teeth and all. Thus, by this one grinding operation, the band is given a uniform, predetermined thickness or gage (determined by the spacing between the wheel peripheries) and has its tooth top portions given the desired cross sectional shape. This may be either the flat parallel sided conventional tooth design which must be set, or the wedge shaped configuration shown in FIGURE 4. For the latter, it is only necessary to have the grinding wheels provided with beveled edge portions 16—16'.

To illustrate the effectiveness of saw bands produced in accordance with this invention, the test results of one particular band are as follows:

*Band Specifications*

Length—217"; width 2".
Backing strip SAE 6150 at 50 Rc.
Tip material (cast-on Globules) M4H.S.S.
Tooth profile 2 Pitch—10°—Cross and Straight Raker with a 10° positive front angle, 10° top angle, .140" gullet depth. Kerf width .080" with side clearance of 8°. Back clearance angles of tooth tip generated by the 8° side grinding.

*Test Procedure*

The band was tested on a DoAll, Model 26–5 Bandmill with 26" diameter band wheels.
Material sawed was 1018 Cold Rolled Steel, 12" thick and 15" to 32" wide.
Cutting rate—10 square inches per minute.
Band speed—175 feet per minute.
Coolant—DoAll #240 (Cutting oil).
Required accuracy of cut—within .002" per inch of work height, i.e. thickness.

This band (with resharpening) cut a total of 68,855 square inches within the specified tolerance of .002" per inch of work height. The band was considered "failed" at this time because the size of the high speed steel tooth tips had been reduced by resharpening to the point where the profile of the tooth was no longer correct. The area cut per resharpening averaged approximately 14,000 square inches.

The band ran 112 hours or 67,200 band cycles (complete circuit or revolution around the band wheels) while cutting. In addition, the band was run idle for 31,100 band cycles at 300 feet per minute for a total of 98,300 band cycles before the 6150 backing developed a fatigue crack.

Since the square inches cut, viz. 68,855 is slightly in excess of the 67,200 band cycles required to do this amount of cutting, the potential life of this band is approximately 100,000 square inches.

From the foregoing description taken in connection with the accompanying drawings, it will no doubt be apparent to those skilled in the art that this invention provides an economically feasible and entirely practicable method of making saw bands and blades, both straight and circular, which combine extremely hard highly effective cutting edges or tips for the teeth with a tough resilient back and tooth body; in which the teeth can be given a wedge shaped cross section to obviate the need for setting the teeth; and can be resharpened several times.

Where the terms "inert atmosphere" or "inert gas" are used herein, it should be understood that any gas, such as argon and helium, which precludes, or at least minimizes, decarbonization with its consequent depletion of carbon or other alloying elements, is contemplated. Also, while in some instances the terms "globule" and "bead" may have been used alternatively herein as descriptive of the quantity of high speed steel deposited upon each of the substantially molten localized edge portions of the backing strip, both in its molten state and in its solidified state, it is more accurate to consider the same a "globule" while in its molten state, and a "bead" after it has solidified. This distinction will be observed wherever possible in the claims which follow.

Also, the terms "strip" and "blade" have been used alternatively herein to identify the back or body of the saw, one edge of which has the saw teeth formed thereon so that where these terms appear in the claims, it should be understood that they merely signify the back or body of the cutting tool whether it be a saw as conventionally understood, or a more specialized metal cutting tool. In the case of a band saw, this back or body is, of course, a very long strip in the true sense of the word. In the case of a hack saw, it would be most logically referred to as a blade; for a circular saw, as a saw blade; and, in other metal cutting tools, it would probably be known simply as a tool carrier.

What is claimed as my invention is:

1. The hereindescribed method of making a metal cutting tool capable of cutting at red heat which comprises: forming well-defined spaced apart corners along an edge of a blade of steel having the properties necessary to withstand shock and have good resistance to fatigue failure; heating said corners to bring the same to substantially the melting point; while each said corner is in substantially the molten state, depositing thereon a globule of molten high speed tool steel, which upon solidifying forms a bead of high speed tool steel that projects beyond the sides of the blade; holding the globule centered on the blade while it is solidifying by applying substantially equal forces thereon from opposite sides of the blade; and shaping the surface of the thus formed beads and the contiguous portions of the blade to form cutting teeth, the tips of which are of high speed tool steel.

2. The method of claim 1, further characterized by the fact that said substantially equal and opposite forces are applied by a cooling medium to thus hasten solidification of the globules.

3. The method of claim 1, wherein the substantially equal and opposite forces are applied to the globules by means of shaping dies to thus preliminarily shape the sides of the beads.

4. The method of claim 1, further characterized by the steps of imparting a predetermined shape to the opposite sides of the globules concomitantly with the application of the centering forces thereon; and shearing off an excess part of each globule while it is held centered and before it solidifies.

5. The hereindescribed method of making a toothed band saw blade which comprises: by means of an electric arc heating to substantially its melting point a small localized edge portion of a relatively thin, flexible steel band having substantially uniform width and thickness and being formed of steel having the properties necessary to withstand shock and provide good resistance to fatigue failure, despite rapidly recurring flexure of the band; at the instant said localized edge portion of the band reaches substantially its melting point projecting a rod or wire of tool steel into the arc and contiguous to the melting edge portion of the band to thereby form and deposit a globule of molten tool steel on the edge of the band; withdrawing the rod or wire of tool steel and terminating the heating the instant the globule attains a size at which it projects beyond both sides of the band but before its surface tension envelop breaks, whereby the ratio of surface to volume of the globule is large enough to effect very rapid quenching of the molten globule; successively repeating the aforesaid steps at each place along the edge of the band where a tooth is to be located; and grinding the surfaces of the beads resulting from solidification of the globules and the contiguous portions of the band to form saw teeth of predetermined configuration with the tip portions thereof entirely of the tool steel used to form the globules.

6. The method of making the toothed band saw blade set forth in claim 5, wherein the withdrawal of the rod or wire and the termination of the heating are timed to assure the globules having a size such that the largest dimension thereof is slightly more than twice the thickness of the band.

7. The method of claim 5, further characterized by the fact that the withdrawal of the rod or wire and the termination of the heat are timed to assure the globules having a surface-to-volume ratio on the order of 60 to 1.

8. The method of making a toothed band saw blade set forth in claim 5, wherein the tool steel used to form the globules is a high speed tool steel so that the beads have a hardness in the 63–66 Rc range, which makes it possible to temper them to secondary hardness without additional hardening; and further characterized by the step of tempering the beads without affecting the hardness or other properties of the band, to bring the beads to secondary hardness.

9. The method of making a metal cutting band saw blade, having hard cutting teeth capable of cutting at red heat, which comprises: melting a localized portion of one edge of a relatively thin flexible band of steel possessing the properties necessary to withstand shock and have good resistance to fatigue failure despite rapidly recurring flexure of the band, to form a small pool of molten steel on said edge of the band; substantially concurrently with the melting of said edge portion, producing and depositing on said pool a globule of molten high speed steel confined solely by its surface tension film and of a size such that its surface area is considerably greater than the surface of the pool, so that the globule and pool join to form a larger globule perched on the edge of the band, with said larger globule of a size such that while its largest dimension is greater than the thickness of the band, the tensile stresses in its surface tension film do not exceed the tensile strength of the film; supporting said larger globule in a predetermined position on the edge of the band while the globule cools and solidifies; repeating the aforesaid procedure at spaced intervals along the edge of the band wherever a cutting tooth is to be located; and shaping the resulting beads and contiguous portions of the band into cutting teeth having tip portions of high speed steel.

10. In the art of making toothed saws, the characterizing steps of: forming the tip of each tooth first as a molten globule of high speed tool stell confined solely by its surface tension film; rapidly quenching the globule to thereby form the same into a bead of high speed tool steel having a hardness in the 63–66 Rc range; and then shaping the bead into the tooth tip.

References Cited in the file of this patent

UNITED STATES PATENTS

| | | |
|---|---|---|
| 54,681 | Buschman | May 15, 1866 |
| 286,706 | Kay | Oct. 16, 1883 |
| 885,770 | Lucas | Apr. 28, 1908 |
| 1,130,650 | Whitaker | Mar. 2, 1915 |
| 1,382,819 | Carlson | June 28, 1921 |
| 1,521,857 | Blum | Jan. 6, 1925 |
| 1,919,358 | Blem | July 25, 1933 |
| 2,326,674 | Pavitt | Aug. 10, 1943 |
| 2,431,517 | Stevens | Nov. 25, 1947 |
| 2,714,317 | Drake | Aug. 2, 1955 |
| 2,826,941 | Kolesh | Mar. 18, 1958 |
| 2,867,137 | Joy | Jan. 6, 1959 |

FOREIGN PATENTS

| | | |
|---|---|---|
| 328,187 | Germany | June 5, 1919 |
| 726,818 | Germany | Oct. 21, 1942 |
| 920,565 | France | Apr. 11, 1957 |